US007578876B2

(12) United States Patent
Nakajima et al.

(10) Patent No.: US 7,578,876 B2
(45) Date of Patent: Aug. 25, 2009

(54) AQUEOUS INK, INK JET RECORDING METHOD, INK CARTRIDGE, RECORDING UNIT, AND INK JET RECORDING APPARATUS

(75) Inventors: Yoshio Nakajima, Yokohama (JP); Sadayuki Sugama, Tsukuba (JP); Shin-ichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/853,479

(22) Filed: Sep. 11, 2007

(65) Prior Publication Data

US 2008/0124481 A1    May 29, 2008

Related U.S. Application Data

(63) Continuation of application No. PCT/JP2007/057334, filed on Mar. 26, 2007.

(30) Foreign Application Priority Data

Mar. 24, 2006  (JP) .............................. 2006-082402

(51) Int. Cl.
*C09D 11/02* (2006.01)
(52) U.S. Cl. .................................... 106/31.65
(58) Field of Classification Search ............... 106/31.65
See application file for complete search history.

(56) References Cited

U.S. PATENT DOCUMENTS

| 4,313,124 | A | 1/1982 | Hara ........................ 346/140 R |
|---|---|---|---|
| 4,345,262 | A | 8/1982 | Shirato et al. ............. 346/140 R |
| 4,459,600 | A | 7/1984 | Sato et al. ................ 346/140 R |
| 4,463,359 | A | 7/1984 | Ayata et al. .................. 346/1.1 |
| 4,558,333 | A | 12/1985 | Sugitani et al. ........... 346/140 R |
| 4,723,129 | A | 2/1988 | Endo et al. .................... 346/1.1 |
| 4,740,796 | A | 4/1988 | Endo et al. .................... 346/1.1 |
| 5,782,967 | A | 7/1998 | Shirota et al. ............. 106/31.58 |
| 6,074,052 | A | 6/2000 | Inui et al. ..................... 347/101 |
| 6,153,001 | A * | 11/2000 | Suzuki et al. ............. 106/31.65 |
| 6,214,963 | B1 | 4/2001 | Noguchi et al. ................ 528/71 |
| 6,387,168 | B1 | 5/2002 | Koitabashi et al. .......... 106/31.6 |
| 6,398,355 | B1 | 6/2002 | Shirota et al. ............... 347/100 |
| 6,494,943 | B1 | 12/2002 | Yu et al. ..................... 106/31.65 |
| 6,506,245 | B1 | 1/2003 | Kinney et al. ................ 106/493 |
| 6,552,156 | B2 | 4/2003 | Noguchi et al. ................ 528/71 |
| 6,561,638 | B1 | 5/2003 | Iijima et al. .................. 347/100 |
| 6,676,254 | B2 | 1/2004 | Nagashima et al. ......... 347/100 |

(Continued)

FOREIGN PATENT DOCUMENTS

JP   59-123670   7/1984

(Continued)

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

The invention provides an aqueous ink that can prevent clogging at an orifice due to drying of the ink though the ink contains a pigment, and can achieve high-level ejection stability required in recent years. The aqueous ink contains at least water, a water-soluble organic solvent and carbon black particles, the carbon black particles including carbon black particles having a particle size of 0.5 μm or more, wherein a proportion made up by the volume of carbon black particles having a particle size of 0.2 μm or more and less than 0.5 μm is 0.3% or less based on the total volume of all the carbon black particles in the ink, a number of carbon black particles having a particle size of 0.5 μm or more and less than 5.0 μm is $1.0 \times 10^7$ or less per mL of the aqueous ink, and an average particle size value of the carbon black particles is from 0.060 μm or more to 0.130 μm or less.

8 Claims, 5 Drawing Sheets

U.S. PATENT DOCUMENTS

| | | | |
|---|---|---|---|
| 6,698,876 B2 | 3/2004 | Sato et al. | 347/100 |
| 6,849,111 B2 | 2/2005 | Suzuki et al. | 106/31.65 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,128,779 B2 | 10/2006 | Osumi et al. | 106/31.52 |
| 7,185,978 B2 | 3/2007 | Nagashima et al. | 347/100 |
| 7,195,340 B2 | 3/2007 | Nagashima et al. | 347/56 |
| 7,195,665 B2 | 3/2007 | Osumi et al. | 106/31.47 |
| 7,208,032 B2 | 4/2007 | Hakamada et al. | 106/31.27 |
| 7,276,110 B2 | 10/2007 | Tsujimura et al. | 106/31.27 |
| 7,276,112 B2 | 10/2007 | Tokuda et al. | 106/31.6 |
| 7,291,211 B2 | 11/2007 | Kaneko et al. | 106/31.27 |
| 7,291,214 B2 | 11/2007 | Tsuji et al. | 106/31.8 |
| 7,297,199 B2 | 11/2007 | Osumi et al. | 106/31.5 |
| 7,297,202 B2 | 11/2007 | Ichinose et al. | 106/31.6 |
| 7,297,203 B2 | 11/2007 | Takada et al. | 106/31.8 |
| 7,303,620 B2 | 12/2007 | Nagashima et al. | 106/31.6 |
| 2004/0035323 A1 | 2/2004 | Suzuki et al. | 106/31.65 |
| 2004/0244622 A1 | 12/2004 | Ichinose et al. | 101/491 |
| 2005/0005818 A1 | 1/2005 | Sato et al. | 106/31.27 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0098067 A1 | 5/2006 | Imai et al. | 347/100 |
| 2006/0098068 A1 | 5/2006 | Hakamada et al. | 347/100 |
| 2006/0103703 A1 | 5/2006 | Nito et al. | 347/100 |
| 2006/0103704 A1 | 5/2006 | Hakamada et al. | 347/100 |
| 2006/0130706 A1 | 6/2006 | Nakajima et al. | 106/499 |
| 2006/0135647 A1 | 6/2006 | Ichinose et al. | 523/160 |
| 2006/0137569 A1 | 6/2006 | Osumi et al. | 106/31.13 |
| 2006/0142416 A1 | 6/2006 | Sakai et al. | 523/160 |
| 2006/0167136 A1 | 7/2006 | Kaneko et al. | 523/160 |
| 2006/0194056 A1 | 8/2006 | Nagashima et al. | 428/403 |
| 2006/0194897 A1 | 8/2006 | Kawabe et al. | 523/160 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| JP | 4-169269 | 6/1992 |
| JP | 10-60327 | 3/1998 |
| JP | 11-92686 | 4/1999 |
| JP | 2001-214113 | 8/2001 |
| JP | 2002-337443 | 11/2002 |
| JP | 3384379 | 3/2003 |
| JP | 2003-513138 | 4/2003 |
| JP | 2003-311993 | 11/2003 |
| JP | 2004-10632 | 1/2004 |
| WO | WO 97/47699 | 12/1997 |
| WO | WO 01/30919 | 5/2001 |

* cited by examiner

AQUEOUS INK, INK JET RECORDING METHOD, INK CARTRIDGE, RECORDING UNIT, AND INK JET RECORDING APPARATUS This application is a continuation of International Application No. PCT/JP2007/057334, filed Mar. 26, 2007, which claims the benefit of Japanese Patent Application No. 2006-082402 filed Mar. 24, 2006.

BACKGROUND OF THE INVENTION

1. Field of the Invention

The present invention relates to an aqueous ink, an ink jet recording method, an ink cartridge, a recording unit and an ink jet recording apparatus.

2. Description of the Related Art

Recently, for inks used in ink jet recording apparatus, development of pigment inks with a pigment used as a coloring material have been vigorously advanced in recent years. However, pigment inks cause increase of particle size due to aggregation of pigment particles with time and sedimentation of the pigment particles according to the Stokes' law. Therefore, an ink having a high pigment concentration and containing a pigment with the particle size thereof increased (hereinafter referred to as sedimentation ink) accumulates on a bottom of an ink cartridge. As a result, in some cases, clogging in an ink flow path and at an orifice may occur to fail to achieve sufficient ejection stability.

In recent years in particular, such measures as described below have been conducted for the purpose of providing clear images little in bleeding at boundary of images formed with a black ink and color inks. In cooperation with the influences thereof, it is harder than before to retain the ejection stability of the ink. More specifically, it is conducted to use a dispersion containing carbon black high in quick drying ability as a coloring material for the purpose of forming clear images, and to make finer an ink flow path in a recording head for the purpose of forming minute ink droplets.

In order to solve the problem of the ejection stability, the following methods have been proposed. For example, it has been proposed to put balls or beads in an ink cartridge, thereby re-dispersing a sedimentation ink (see Japanese Patent Application Laid-Open No. H04-169269). An ink cartridge which is equipped with a memory means, in which data for determining the sedimentation rate of a pigment and the like in an ink has been stored, and controls an agitating operation according to the data stored in the memory means has also been proposed (see Japanese Patent Application Laid-Open No. 2003-311993).

An ink cartridge IC for which at least one of the following three ways of thinking is taken has further been proposed (see Japanese Patent No. 3,384,379).

(1) A structure with which a sedimentation ink is inhibited from being mixed into a pigment ink to be fed (structure inhibiting the feed of the sedimentation ink).

(2) A structure with which the occurrence (or precipitation) of a sedimentation ink is inhibited (structure inhibiting the occurrence of the sedimentation ink).

(3) A structure with which a sedimentation ink can be excluded at an initial feeding after preservation (structure accelerating the exclusion of the sedimentation ink).

In addition, the following proposals have been made for solving the problem of the sedimentation ink. An ink jet black ink with which a high black image density is achieved in a short drying time, and bleeding between a black image area and a color image area is little when a recording time difference between the black ink and the color ink is short has been proposed (see Japanese Patent Application Laid-Open No. 2004-10632). More specifically, the volume-average dispersed particle size of dispersed particles in an ink is from 85 nm or more to 115 nm or less, and the volume of particles having a particle size within a range of from 0.5 µm or more to 1.0 µm or less is from 0.001% or more to 0.03% or less based on the volume of the ink. In order to provide an ink excellent in long-term stability as an ink jet ink, a proposal has also been made that an ink preferably has the following parameters (see Japanese Patent Publication No. 2003-513138). More specifically, the ink has such a stability that a particle size distribution of from about 10 nm or more to 300 nm or less, and an Accusizer number that the number of particles exceeding 0.5 µm in particle size per mL of a dispersion liquid (solid content: 15%) is less than $10^{10}$ do not change until exceeding 50% in one week at 25° C.

An investigation by the present inventors have revealed that such problems that the clogging occurs in an ink flow path and at an orifice and sufficient ejection stability is not achieved are caused even when ink cartridges satisfying the structures disclosed in Japanese Patent Application Laid-Open No. H04-169269, Japanese Patent Application Laid-Open No. 2003-311993 and Japanese Patent No. 3,384,379 are used. The reason for it is considered to be attributable to the fact that although the cartridges have an effect to slow the sedimentation phenomenon of the pigment particles in the pigment ink, the ink itself does not have a function of preventing the sedimentation of the pigment particles. As described in Japanese Patent No. 3,384,379, the structure with which a sedimentation ink in the ink cartridge can be excluded at an initial feeding after preservation is adopted, whereby the sedimentation ink can be excluded. However, it has been found that waste ink not used in recording is produced in plenty according to this method, and so the method is not preferred in this respect.

The present inventors have prepared inks satisfying the constitutions disclosed in Japanese Patent Application Laid-Open No. 2004-10632 and Japanese Patent Publication No. 2003-513138 and investigated the inks. As a result, it has been found that these inks cause clogging in an ink flow path and at an orifice, and so sufficient ejection stability is not achieved. The reason for it is considered to be attributable to the fact that although the performance for the technical level required in the prior art can be sufficiently satisfied by defining the volume and number of particles having an average particle size or particle size of 0.5 µm or more, such a technique cannot sufficiently cope with the technical level required in recent years. In other words, it is considered that the technical level required in recent years is very strict, and so such conventional techniques as described above do not come to satisfy high performance corresponding to such level.

The present inventors have thus analyzed the cause and mechanism for which the strict technical level required in recent years cannot be satisfied by using the conventional inks. As a result, the inventors arrived at the following idea. It is considered that since the number and volume of the particles having a particle size of 0.5 µm or more are in an extremely small proportion based on the whole ink, the inventions described in Japanese Patent Application Laid-Open No. 2004-10632 and Japanese Patent Publication L No. 2003-513138 only define a tiny part with respect to the whole figure of the particle size distribution.

Japanese Patent Publication No. 2003-513138 describes an ink jet ink having such a stability that the number and volume of particles having a particle size of 0.5 µm or more do not change until exceeding 50% in one week in preservation at a temperature of 25° C. However, changes in a longer period of time than this period are not specifically described, and so the ink may not be said to have sufficient performance for high-level ejection stability required in recent years.

SUMMARY OF THE INVENTION

It is accordingly an object of the present invention to provide an aqueous ink that can prevent clogging at an orifice due to drying of the ink, which has been a problem of the prior art, and can achieve high-level ejection stability required in recent years. Another object of the present invention is to provide an ink jet recording method, an ink cartridge, a recording unit and an ink jet recording apparatus using such an aqueous ink.

The above objects can be achieved by the present invention described below. More specifically, an aqueous ink according to the present invention comprises at least water, a water-soluble organic solvent and carbon black particles, the carbon black particles including carbon black particles having a particle size of 0.5 μm or more, wherein a proportion made up by the volume of carbon black particles having a particle size of 0.2 μm or more and less than 0.5 μm is 0.3% or less based on the total volume of all the carbon black particles in the aqueous ink, a number of carbon black particles having a particle size of 0.5 μm or more and less than 5.0 μm is $1.0 \times 10^7$ or less per mL of the aqueous ink, and an average particle size value of the carbon black particles is from 0.060 μm or more to 0.130 μm or less.

An ink jet recording method according to another embodiment of the present invention comprises ejecting an ink by an ink jet method, wherein the above-described aqueous ink is used as the ink.

An ink cartridge according to a further embodiment of the present invention comprises an ink storage portion storing an ink, wherein the above-described aqueous ink is stored in the ink storage portion.

A recording unit according to a still further embodiment of the present invention comprises an ink storage portion storing an ink and a recording head for ejecting the ink, wherein the above-described aqueous ink is stored in the ink storage portion.

An ink jet recording apparatus according to a yet still further embodiment of the present invention comprises an ink storage portion storing an ink and a recording head for ejecting the ink, wherein the above-described aqueous ink is stored in the ink storage portion.

According to the present invention, an aqueous ink that can prevent clogging at an orifice due to drying of the ink and has excellent ejection stability can be provided though the ink contains carbon black as a pigment. In another embodiment of the present invention, an ink jet recording method, an ink cartridge, a recording unit and an ink jet recording apparatus, which are excellent in ejection stability, are provided by using the above aqueous ink having excellent properties.

Further features of the present invention will become apparent from the following description of exemplary embodiments with reference to the attached drawings.

DESCRIPTION OF THE EMBODIMENTS

Figure 1:
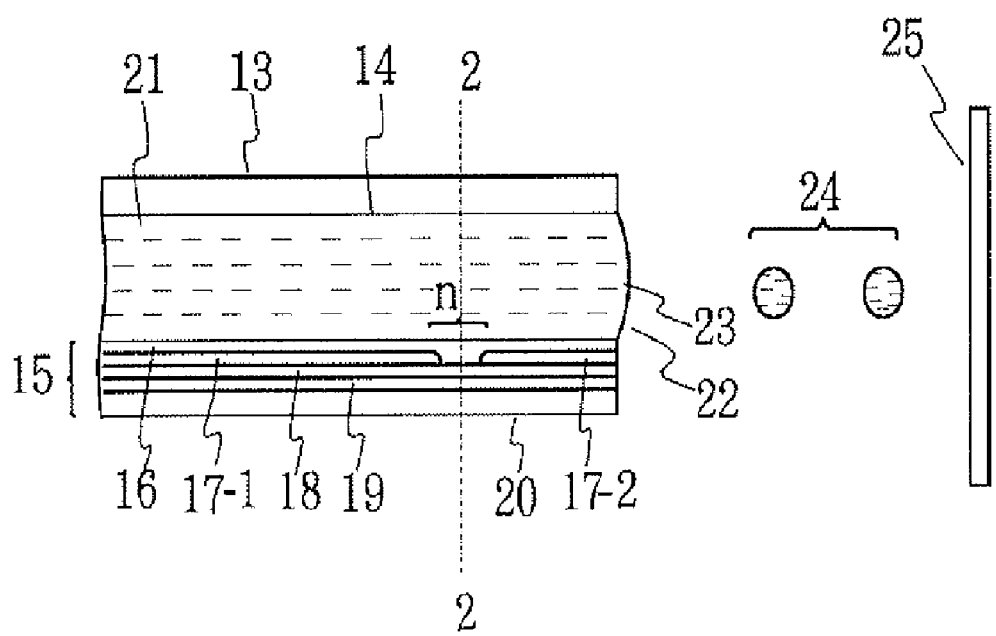
FIG. 1 is a longitudinal cross-sectional view illustrating a recording head.

The present invention will hereinafter be described in detail by exemplary embodiments. Carbon black in an ink is present in a state of primary particles each formed of a particle or in a state of a structure in which a plurality of the primary particles are aggregated. The term "carbon black" or "carbon black particles" in the present invention means carbon black particles in a state being present in an ink irrespective of the above-described present state of particles. Incidentally, the carbon black particles may be referred to as "particles" merely in the following description. In the following description, the term "proportion made up by the volume of particles" means a proportion based on the total volume of all particles in an ink. "Particle size" in the present invention is "a particle size in terms of volume" and specifically means a particle size of carbon black particles determined by conversion to a particle size of a standard sample (spherical form) of a styrene latex having the same volume as the carbon black particles.

The present inventors have carried out an investigation as to pigment inks containing carbon black particles with a view toward satisfying the strict technical level required in recent years against such prior art as described above. As a result, it has been found that it is important to specify a particle size distribution in a range, which has not been considered in the prior art, i.e., a particle size distribution of 0.2 μm or more and less than 0.5 μm that is intermediate between the average value of the particle size distribution and 0.5 μm or more. More specifically, it has been found that by providing an aqueous ink (hereinafter may also be referred to as "ink" merely) having the following constitution, the above problems can be solved, clogging at an orifice due to drying of the ink can be prevented, and high-level ejection stability required in recent years can be achieved.

[Aqueous Ink]

The aqueous ink according to the present invention includes at least water, a water-soluble organic solvent and carbon black particles, the carbon black particles including carbon black particles having a particle size of 0.5 μm or more, a proportion made up by the volume of carbon black particles having a particle size of 0.2 μm or more and less than 0.5 μm is 0.3% or less based on the total volume of all the carbon black particles in the aqueous ink, a number of carbon black particles having a particle size of 0.5 μm or more and less than 5.0 μm is $1.0 \times 10^7$ or less per mL of the aqueous ink, and an average particle size value of the carbon black particles is from 0.060 μm or more to 0.130 μm or less.

The carbon black particles having a particle size of 0.5 μm or more are present in a certain proportion in an ink when such a preparation method of an ink or dispersion method of a carbon black dispersion as generally conducted is used. On the other hand, the substantial exclusion of the carbon black particles having a particle size of 0.5 μm or more from the ink for the purpose of reducing the possibility of occurrence of hetero-aggregation, which will be described in detail subsequently, may be said not to be efficient from the viewpoint of achieving the effect of the present invention. A feature of the present invention resides in that the characteristics of carbon black particles, such as particle size distribution, which will be described below, are defined to provide an ink free from clogging at an orifice due to drying of the ink and excellent in ejection stability, although the ink contains carbon black.

(Proportion Made Up by the Volume of Carbon Black Particles Having a Particle Size of 0.2 µm or More and Less than 0.5 µm)

As described above, the volume of particles having a particle size of 0.5 µm or more is in a tiny proportion according to the investigation by the present inventors. Therefore, the technical level of ink (measures for formation of a fine ink flow path and formation of minute ink droplets), which has been required in recent years, can not be satisfied only by defining the number and volume of the particles having a particle size of 0.5 µm or more. It is thus very important to define a particle size distribution in a range of smaller particle size than those particles.

The present inventors have carried out an investigation with attention paid to the above point of view. As a result, it has been found that the proportion made up by the volume of particles having a particle size of 0.2 µm or more in particular greatly affects ejection performance. In other words, it has been confirmed that the proportion made up by the volume of particles having a particle size less than 0.2 µm among a particle size range of particle sizes smaller than 0.5 µm does not affect the ejection performance so much. Thus, the present inventors have carried out an investigation as to relevance between the proportion made up by the volume of particles having a particle size of 0.2 µm or more and less than 0.5 µm and ejection performance. As a result, it has been found that when the proportion made up by the volume of the particles having a particle size of 0.2 µm or more and less than 0.5 µm exceeds 0.3% based on the total volume of all particles in an ink, the following problem is offered. Specifically, it has been found that clogging at an orifice due to drying of the ink is easy to occur, and ejection stability may be markedly lowered in some cases when a recording head, in which an ink flow path has been made fine in particular, is used.

The present inventors consider the reason for the above problem to be attributable to the fact that hetero-aggregation that coarse particles aggregate with fine particles present around the coarse particles entangled therein is easy to occur. In other words, the presence of the hetero-aggregated particles is easy to lead to sedimentation of particles in an ink cartridge. As a result, the sedimentation ink produced at the bottom of the ink cartridge is easy to cause clogging in the ink flow path and at the orifice. In addition, when a recording head is left to stand for a long period of time in a condition where the ink cartridge is installed therein, the hetero-aggregation is likewise easy to occur, which forms the cause of the clogging in the ink flow path and at the orifice.

The comparison of the above-described phenomenon with the adverse influence by the presence of the particles having a particle size of 0.5 µm or more, which are described in the above-mentioned prior art (Japanese Patent Application Laid-Open No. 2004-10632 and Japanese Patent Publication No. 2003-513138), will be described below. In a pigment ink required for good dispersibility, the volume of particles having a particle size of 0.2 µm or more and less than 0.5 µm, which is defined in the present invention, is overwhelmingly great compared with the volume of particles having a particle size of 0.5 µm or more (about 50 times or more). Thus the aforementioned hetero-aggregation is very likely to take place. Therefore, the number and volume of hetero-aggregates by the particles having a particle size of 0.2 µm or more and less than 0.5 µm are overwhelmingly great compared with hetero-aggregates by the particles having a particle size of 0.5 µm or more even when the particle size thereof is small. As a result, it is considered that the sedimentation phenomenon of the ink in the interior of the ink cartridge and the clogging in the ink flow path and at the orifice when the recording head is left to stand for a long period of time in a condition where the ink cartridge is installed therein are greatly affected by the proportion made up by the volume of the particles having the specific particle size, particularly by the proportion made up by the volume of the particles whose particle sizes fall within a range of from 0.2 µm or more to less than 0.5 µm.

It is considered that the particles, which have undergone the hetero-aggregation once, continuously change from an unstable dispersed state to a stable dispersed state. Therefore, it is considered that such problems as described above is easier to occur with time and especially when preserved at a high temperature though the problems do not arise so much an initial stage.

In the present invention, it is thus necessary that the proportion made up by the volume of the carbon black particles having a particle size of 0.2 µm or more and less than 0.5 µm is 0.3% or less based on the total volume of all the carbon black particles in the ink. When the proportion made up by the volume of the particles having a particle size of 0.2 µm or more and less than 0.5 µm exceeds 0.3% based on the total volume of all the particles in the ink, the ejection stability may be lowered in some cases as described above.

Incidentally, the proportion made up by the volume of the particles having a particle size of 0.2 µm or more and less than 0.5 µm can be determined by means of, for example, a particle size distribution meter (UPI150EX; manufactured by NIKKISO) of a dynamic light scattering system. Needless to say, the present invention is not limited thereto. The determination conditions are preferably set as follows.

Particle size distribution meter: UPI150EX (manufactured by NIKKISO)

Setzero: 10 s or more to 120 s or less

Measurement time: 30 s or more to 300 s or less

Number of measurements: 1 time or more to 5 times or less.

(Number of carbon black Particles Having a Particle Size of 0.5 µm or More and Less than 5.0 µm)

In the present invention, it is also necessary that the number of carbon black particles having a particle size of 0.5 µm or more and less than 5.0 µm is $1.0 \times 10^7$ or less per mL of the ink. As a result of an investigation by the present inventors, it has been found that when the number of the carbon black particles having a particle size of 0.5 µm or more and less than 5.0 µm exceeds $1.0 \times 10^7$, the above-described hetero-aggregation is easier to occur. In other words, the sedimentation phenomenon of the ink in the interior of the ink cartridge and the clogging in the ink flow path and at the orifice when the recording head is left to stand for a long period of time in a condition where the ink cartridge is installed therein are easier to occur. However, as described above, excellent ejection stability can be achieved when the number of the particles having a particle size of 0.5 µm or more and less than 5.0 µm is $1.0 \times 10^7$ or less per mL of the ink.

The number of the particles having a particle size of 0.5 µm or more and less than 5.0 µm can be determined by means of, for example, a particle size distribution meter (Accusizer 780APS; manufactured by Particle Sizing System) of a number counting method. The above-described meter detects scattered light from each of particles having a particle size of 0.5 µm or more passing through a sensing zone to convert the intensity of a signal thereof to a particle size. Needless to say, the present invention is not limited thereto.

(Average Particle Size Value of Carbon Black Particles)

In the present invention, it is necessary that the average particle size value of the carbon black particles is from 0.060 µm or more to 0.130 µm or less. When the average particle size value exceeds 0.130 µm, the ejection stability in particular may be greatly lowered in some cases. When the average particle size value is less than 0.060 µm on the other hand, the specific surface area of the carbon black becomes too large, and so the dispersion stability may be lowered in some cases. In this case, the proportion made up by the volume of the particles having a particle size of 0.2 µm or more and less than 0.5 µm tends to greatly change when the ink is preserved for a long period of time in particular, which is not preferable.

Incidentally, the average particle size value in the present invention is $d_{50}$ (average particle size value based on the volume=volume average particle size). The average particle size value ($d_{50}$; volume average particle size) can be determined by means of, for example, a particle size distribution meter (UPI-150; manufactured by NIKKISO) of a dynamic light scattering system. Needless to say, the present invention is not limited thereto. The determination conditions are preferably set as follows.

Particle size distribution meter: UPI150EX (manufactured by NIKKISO)
Setzero: 10 s or more to 120 s or less
Measurement time: 30 s or more to 300 s or less
Number of measurements: 1 time or more to 5 times or less.

(Rate of Change in Proportion Made Up by the Volume of Particles Having a Particle Size of 0.2 µm or More and Less than 0.5 µm)

In the present invention, the following requirements are preferably satisfied. More specifically, it is preferable that the proportion (A) made up by the volume of carbon black particles having a particle size of 0.2 µm or more and less than 0.5 µm is 0.3% or less based on the total volume of all the carbon black particles in the ink, the proportion (B) made up by the volume of carbon black particles having a particle size of 0.2 µm or more and less than 0.5 µm in the ink after the ink is preserved at a temperature of 60° C. for one month is 0.3% or less based on the total volume of all the carbon black particles in the ink after the preservation, and (A) and (B) satisfy the relationship of (B)/(A)<1.7.

The above-described requirements mean the following two conditions. First, it is meant that the proportion made up by the volume of the particles having a particle size of 0.2 µm or more and less than 0.5 µm in each of the inks before and after the preservation at a temperature of 60° C. for one month is 0.3% or less based on the total volume of all the particles in each of the inks. Second, it is meant that the rate of change (rate of increase) in the proportion made up by the volume of the particles having a particle size of 0.2 µm or more and less than 0.5 µm is less than 70% between before and after the ink is preserved at the temperature of 60° C. for a month.

The preservation test in which the ink is preserved at the temperature of 60° C. for one month is an accelerated test that assumes preservation at ordinary temperature for about 1 year, which is considered to correspond to a period of time and a temperature of use of the ink by common users. The ink satisfying the above-described requirements means that the proportion made up by the volume of the particles having a particle size of 0.2 µm or more and less than 0.5 µm is kept at 0.3% or less based on the total volume of all the particles in the ink even when the ink is preserved at ordinary temperature for about 1 year. In other words, the ink satisfies the above-described requirements, whereby the excellent ejection stability thereof can be retained over a period of time for which common users use the ink.

The rate of change in the proportion made up by the volume of the particles having a particle size of 0.2 µm or more and less than 0.5 µm between before and after the preservation at the temperature of 60° C. for one month can be inspected by the following method. First, the proportion made up by the volume of particles having a particle size of 0.2 µm or more and less than 0.5 µm in an ink that is an object of inspection is determined. This proportion is regarded as the proportion (A) made up by the volume of the particles having a particle size of 0.2 µm and less than 0.5 µm before the preservation. The same ink as described above is then put in a closed container having a proper volume and preserved at a temperature of 60° C. for one month. Thereafter, the ink is cooled back to ordinary temperature and stirred, and the proportion made up by the volume of particles having a particle size of 0.2 µm or more and less than 0.5 µm in this ink is determined. This proportion is regarded as the proportion (B) made up by the volume of the particles having a particle size of 0.2 µm and less than 0.5 µm after the preservation. The rate of change between before and after the preservation can be determined by comparing the proportions (A) and (B) thus obtained.

In the present invention, it is particularly preferable that (A) and (B) satisfy the relationship of (B)/(A)<1.7 as described above. When the thus-determined rate of change in the proportion made up by the volume of the particles having a particle size of 0.2 µm and less than 0.5 µm between before and after the preservation at the temperature of 60° C. for one month is 70% or more, i.e., (B)/(A)>1.7, the ejection stability may be markedly lowered particularly with time in some cases.

[Components Making Up Aqueous Ink]

In the aqueous ink according to the present invention, no particular limitation is imposed on the characteristics of raw materials used so far as carbon black particles satisfy the above-described characteristics such as particle size distribution, and the ink may have the same constitution as in conventional aqueous inks. The components making up the aqueous ink according to the present invention will hereinafter be described specifically.

<Carbon Black Dispersion>

The aqueous ink according to the present invention includes at least water, a water-soluble organic solvent and carbon black particles. A carbon black dispersion (may also be referred to as a pigment dispersion) used in the preparation of the ink will hereinafter be described. In the carbon black dispersion used in the aqueous ink according to the present invention, no particular limitation is imposed on the characteristics of raw materials used so far as the above-described characteristics are satisfied. For example, the method of dispersing carbon black may be either a self-dispersion type carbon black dispersion or a polymer-dispersion type (resin-dispersion type) carbon black dispersion.

Here, the self-dispersion type carbon black dispersion means a carbon black dispersion using, as a raw material, a carbon black dispersible in an aqueous medium by only carbon black itself in a condition where a dispersant such as a surfactant or a polymer dispersant is not contained in an ink. The polymer-dispersion type (resin-dispersion type) carbon black dispersion means a carbon black dispersion using, as a raw material, a carbon black dispersible in an aqueous medium when dispersing the carbon black with a dispersant such as a surfactant or a polymer dispersant.

(Self-Dispersion Type Carbon Black)

In the self-dispersion type carbon black dispersion, is used a carbon black to the surface of which at least one ionic group is bonded directly or through another atomic group. No particular limitation is imposed on the carbon black so far as this condition is satisfied, and the following self-dispersion type carbon blacks may be used. Examples of the carbon black include a carbon black to the surface of which a compound having an ionic group is bonded through a diazo coupling method, and a carbon black into the surface of which an ionic group is introduced by a surface oxidation treatment such as an oxidation treatment with sodium hypochlorite or underwater ozone treatment. These carbon blacks may be used in combination of two or more thereof, to say nothing of single use.

In particular, a self-dispersion type carbon black, to which at least one selected from the group consisting of —COOM, —SO$_3$M and —PO$_3$HM (M in the formulae is a hydrogen atom, alkali metal, ammonium or organic ammonium) is chemically bonded through a diazo coupling method, may be preferably used. The above-described functional group may be chemically bonded to the surfaces of carbon black particles directly or through another atomic group. Specific examples of said another group include alkylene groups having 1 to 12 carbon atoms, a substituted or unsubstituted phenylene group and a substituted or unsubstituted naphthylene group. Such self-dispersion type carbon black is described in, for example, International Publication No. 97/47699, Pamphlet. In the present invention, a pigment in which —COOM, among the above-mentioned ionic groups, is chemically bonded to the surfaces of carbon black particles directly or through another atomic group is particularly preferably used.

(Polymer-Dispersion Type (Resin-Dispersion Type) Carbon Black)

As the surfactant or polymer dispersant used in the polymer-dispersion type carbon black, any surfactant or polymer dispersant may be used so far as it has water-solubility. When a resin having water-solubility is used as the polymer dispersant, the weight average molecular weight thereof is preferably from 1,000 or more to 100,000 or less, more preferably from 3,000 or more to 25,000 or less. The acid value of the water-soluble resin is preferably from 30 mg KOH/g or more to 400 mg KOH/g or less, more preferably from 50 mg KOH/g or more to 250 mg KOH/g or less.

Favorable examples of the polymer dispersant include copolymers including at least 2 monomers (at least one thereof is a hydrophilic monomer) selected from the following hydrophobic monomers, nonionic monomers and hydrophilic monomers, and salts of these copolymers. The copolymer may be any of a block copolymer, a random copolymer and a graft copolymer.

Examples of the hydrophobic monomers include acrylic ester monomers such as methyl acrylate, ethyl acrylate, isopropyl acrylate, n-propyl acrylate, n-butyl acrylate, t-butyl acrylate and benzyl acrylate; methacrylic ester monomers such as methyl methacrylate, ethyl methacrylate, isopropyl methacrylate, n-propyl methacrylate, n-butyl (or t-butyl) methacrylate, isobutyl methacrylate, tridecyl methacrylate and benzyl methacrylate; styrene monomers such as styrene, α-methylstyrene, o-methylstyrene, m-methylstyrene, p-methylstyrene and p-tert-butylstyrene; itaconic ester monomers such as benzyl itaconate; maleic ester monomers such as dimethyl maleate; fumaric ester monomers such as dimethyl fumarate; and besides acrylonitrile, methacrylonitrile and vinyl acetate.

As the hydrophilic monomer, there may be suitably used a monomer having an anionic group or nonionic group. Specific examples of the monomer having the anionic group include monomers having a carboxylic group, such as acrylic acid, methacrylic acid, crotonic acid, ethacrylic acid, propylacrylic acid, isopropylacrylic acid, itaconic acid and fumaric acid and salts thereof; monomers having a sulfonic group, such as styrenesulfonic acid, sulfonic acid-2-propylacrylamide, acrylic acid-2-ethyl sulfonate, methacrylic acid-2-ethyl sulfonate and butylacrylamido-sulfonic acid and salts thereof; and monomers having a phosphonic group, such as methacrylic acid-2-ethyl phosphonate and acrylic acid-2-ethyl phosphonate. Among these, acrylic acid and methacrylic acid are particularly preferably used.

Examples of the monomer having the nonionic group include monomers having a radically polymerizable unsaturated bond and a hydroxyl group exhibiting strong hydrophilicity at the same time in their structures, such as hydroxymethyl (meth)acrylate, hydroxyethyl (meth)acrylate and hydroxypropyl (meth)acrylate; monomers having an alkylene oxide group, such as methoxypolyethylene glycol (meth)acrylate, ethoxypolyethylene glycol (meth)acrylate, polyethylene glycol (meth)acrylate and polypropylene glycol (meth)acrylate; and besides publicly known or novel various oligomers and macromonomers.

Among the above-described copolymers, copolymer of styrene or benzyl methacrylate and acrylic acid or methacrylic acid may be preferably used since they can be relatively simply polymerized, and excellent ejection stability can be imparted to the resulting aqueous ink. In the present invention, a resin containing styrene and acrylic acid as monomers is particularly preferably used as the dispersant. Needless to say, the present invention is not limited thereto. These dispersants is preferably used in a state dissolved in water (alkali-soluble resin) by neutralizing them with a base such as sodium hydroxide, potassium hydroxide, ammonia or dimethylethanolamine.

The content (mass %) of the water-soluble resin used as the dispersant for pigment is preferably within a range of from 0.1 mass % or more to 10.0 mass % or less based on the total mass of the ink. The proportion of the content of the pigment to the content of the water-soluble resin is preferably within a range of from content of the pigment/content of the water-soluble resin=95/5 to 40/60), i.e., a range of from 0.67 or more to 19 or less.

As a method for dispersing the polymer-dispersion type (resin-dispersion type) carbon black in water, may be used any dispersing method used in the preparation of conventional pigment inks. May be mentioned, for example, dispersing machines such as a paint shaker, sand mill, bead mill, agitator mill and triple roll mill; high pressure homogenizers such as a micro-fluidizer, nanomizer and altimizer, and an ultrasonic dispersing machine. In the present invention, any method may be used without limitation so far as the method is a dispersing method generally used in the preparation of a pigment dispersion.

Among the above-mentioned machines, the bead mill is most preferably used from the viewpoints of simplicity and dispersion stability. With respect to operating conditions for the bead mill, the following conditions are preferable though the conditions are not particularly limited thereto.

Bead filling rate: 50% or more to 90% or less, preferably 70% or more to 85% or less Bead diameter: 0.05 mm or more to 1 mm or less, preferably 0.1 mm or more to 0.9 mm or less Number of revolutions: 300 rpm or more to 5,000 rpm or less, preferably 1,000 rpm or more to 2,000 rpm or less Dispersion time: 0.1 hour or more to 24 hours or less, preferably 1 hour or more to 10 hours or less.

(Carbon Black)

Examples of carbon black used in the preparation of the carbon black dispersion include furnace black, lamp black, acetylene black and channel black. Specifically, the following commercially available products may be used.

Raven: 7000, 5750, 5250, 5000 ULTRA, 3500, 2000, 1500, 1250, 1200, 1190 ULTRA-II, 1170 and 1255 (all, products of Columbian); Black Pearls L and 880, Regal: 400R, 330R and 660R, Mogul L, Monarch: 700, 800, 880, 900, 1000, 1100, 1300, 1400 and 2000, and Vulcan XC-72R (all, products of CABOT); Color Black: FW1, FW2, FW2V, FW18, FW200, S150, S160 and S170, Printex: 35, 55, 60, 65, 70, 80, 90, U, V, 140U and 140V, and Special Black: 6, 5, 4A and 4 (all, products of Degussa); and No. 25, No. 33, No. 40, No. 47, No. 52, No. 900, No. 2300, MCF-88, MA600, MA7, MA8 and MA100 (all, products of MITSUBISHI CHEMICAL CORPORATION).

However, the present invention is not limited thereto, and any carbon black conventionally known may be used. Carbon black newly prepared for the present invention may also be used. Among the carbon blacks mentioned above, a carbon black having the following characteristics with respect to specific surface area and DBP oil absorption is preferably used from the viewpoints of dispersibility of the pigment and ink jet suitability of the resulting ink. More specifically, the specific surface area of the carbon black is preferably from 40 $m^2/g$ or more to 600 $m^2/g$ or less. The DBP oil absorption of the carbon black is preferably from 50 mL/100 g or more to 125 mL/100 g or less, more preferably from 50 mL/100 g or more to 200 mL/100 g or less. The content (mass %) of the carbon black in the ink is preferably from 0.1 mass % or more to 15.0 mass % or less, more preferably from 1.0 mass % to 10.0 mass % or less based on the total mass of the ink.

<Aqueous Medium>

A mixed solvent of water and a water-soluble organic solvent is used in the ink according to the present invention. As the water, it is preferable to use deionized water. The content (mass %) of water in the ink is preferably from 50.0 mass % or more to 95.0 mass % or less based on the total mass of the ink. No particular limitation is imposed on the water-soluble organic solvent. For example, any of the following solvents may be used. These water-soluble organic solvents may be used either singly or in any combination thereof. The content (mass %) of the water-soluble organic solvent in the ink is preferably from 3.0 mass % or more to 60.0 mass % or less, more preferably from 5.0 mass % or more to 45.0 mass % or less.

Specific examples of water-soluble organic solvents usable in the ink according to the present invention include polyhydric alcohols such as ethylene glycol, glycerol, diethylene glycol, propylene glycol, triethylene glycol, 1,5-pentanediol, 1,2-hexanediol, 1,6-hexanediol and 1,2,6-hexanetriol; trimethylolpropane; polyethylene glycols having an average molecular weight of 200 to 2,000, specifically an average molecular weight of 200, 400, 600, 1,000 or 2000; nitrogen-containing solvents such as 2-pyrrolidone; and saccharides such as glucose and galactose.

In order to achieve a high image density and improve bleeding performance with respect to color inks, a water-soluble organic solvent, which does not substantially solvate carbon black, is particularly preferably used. In other words, the aqueous ink according to the present invention does not affect preservation stability and ejection stability even when the ink contains the water-soluble organic solvent, which does not substantially solvate carbon black. The condition that the water-soluble organic solvent does not substantially solvate carbon black can be determined by dispersing the carbon black in the water-soluble organic solvent. Specifically, a water-soluble organic solvent, which is an object of determination, is added to a ground product of carbon black obtained by grinding carbon black obtained by putting an ink in a petri dish and sufficiently drying the ink to evaporate water, and the resultant liquid mixture is stirred for about 1 hour and then left at rest. With respect to this liquid mixture, whether solid-liquid phase separation occurs or not is visually determined. When the solid-liquid phase separation occurs at this time, it can be determined that such a water-soluble organic solvent does not substantially solvate carbon black.

Specific examples of the water-soluble organic solvent, which does not substantially solvate carbon black, include polyethylene glycols having an average molecular weight of 200 to 600, particularly an average molecular weight of 200, 400 or 600, 1,5-pentanediol, 1,4-pentanediol, 1,2,6-hexanetriol and 2-pyrrolidone. These water-soluble organic solvents may be used either singly or in any combination thereof. The content (mass %) of these water-soluble organic solvents is preferably from 1.0 mass % or more to 15.0 mass % or less based on the total mass of the ink. The content (mass %) of the water-soluble organic solvent, which does not substantially solvate carbon black, is preferably from 10.0 mass % or more to 80.0 mass % or less based on the content (mass %) of all water-soluble organic solvents in the ink. If the content of the water-soluble organic solvent, which does not substantially solvate carbon black, is less than 10.0 mass %, high image density and bleeding performance may not be sufficiently achieved in some cases. If the content exceeds 80.0 mass %, the preservation stability of the ink may not be sufficiently achieved in some cases. It is preferable that the ratio of the content (mass %) of the carbon black in the ink to the content (mass %) of the water-soluble organic solvent, which does not substantially solvate carbon black, is from 0.2 times or more to 3.0 times or less. Namely, the value of (the content of carbon black/the content of the water-soluble organic solvent, which does not substantially solvate carbon black) is preferably from 0.2 times or more to 3.0 times or less. If the ratio is less than 0.2 times, the preservation stability of the ink may not be sufficiently achieved in some cases. If the ratio exceeds 3.0 times, high image density and bleeding performance may not be sufficiently achieved in some cases.

<Other Components>

Besides the above components, various additives such as surfactants, pH adjustors, rust preventives, preservatives, mildewproofing agents, antioxidants, anti-reducing agents, evaporation accelerators and chelating agents may be contained in the ink according to the present invention as needed. The ink is provided as an ink containing a polymer, whereby the abrasion resistance and highlighter resistance of the resulting image can be improved. In particular, a nonionic polymer having no ionic group scarcely affects the reliability of the ink and may be preferably used.

<Preparation Process of Ink>

In order to provide an aqueous ink satisfying such particle size distribution of carbon black as described above, a purification method such as centrifugation and/or filtration is preferably used in the preparation of the carbon black dispersion used in the preparation of the aqueous ink and the preparation of the aqueous ink. As the purification method usable in the present invention, any method may be used without limitation so far as it is a method generally used for coloring materials. In the purification of the carbon black dispersion, it is particularly preferable to remove coarse particles by a centrifugal separator. In the purification of the aqueous ink, it is particularly preferable to conduct filtration under reduced pressure by a filter. In order to satisfy the above-described characteristics, such as particle size distribution, of carbon black particles in particular, it is preferable to filter the ink using a filter having a pore size of 1.5 μm or less upon the purification of the aqueous ink. Needless to say, the present invention is not limited to these purification methods, and the constitution of the present invention is met so far as the above-described characteristics, such as particle size distribution, of carbon black particles are satisfied.

<Color Inks>

The aqueous ink according to the present invention may be combined with other ink jet inks (color inks) and used as an aqueous ink set in the formation of images. The color inks will hereinafter be described.

In the present invention, any ink jet aqueous color inks conventionally known may be used. Color inks preferably contain at least water, a water-soluble organic solvent and a coloring material. As the coloring material of the color ink, may be mentioned a water-soluble dye. In particular, a water-soluble dye having an anionic group as a solubilizing group is preferably used. The color tones of the color inks used in the present invention may be suitably chosen for use from, for example, cyan, magenta, yellow, red, green, blue and orange.

As coloring materials of color inks, which can be used in the present invention in addition to the above coloring materials, may be used dyes having a solubilizing group such as a carboxyl group, oil-soluble dyes or pigments.

An aqueous medium and other additives used upon the preparation of the color inks usable in the present invention may be the same as those used in the aqueous ink according to the present invention.

<Physical Properties of Ink>

The aqueous ink of the above-described constitution according to the present invention and the color inks usable together with the ink preferably have properties which enable satisfactory ejection from a recording head. Therefore, each of the inks preferably has a viscosity of from 1 mPa·s or more to 15 mPa·s or less, more preferably from 1 mPa·s or more to 5 mPa·s or less, and a surface tension of from 25 mN/m or more to 50 mN/m or less.

[Ink Jet Recording Method, Ink Cartridge, Recording Unit and Ink Jet Recording Apparatus]

The aqueous ink according to the present invention is usefully used as an ink used in a recording unit equipped with a recording head of an ink jet ejection system and an ink storage portion. The use mode of the aqueous ink according to the present invention and the aqueous ink set combined with the ink is not limited thereto, and the ink and ink set may also be useful as ink cartridges storing these inks or inks for charge into the ink cartridges. In particular, the aqueous ink according to the present invention brings about an excellent effect in recording heads and ink jet recording apparatus of a Bubble-Jet (trademark) system among the ink jet methods.

With respect to the typical construction and principle of the recording heads and ink jet recording apparatus of the Bubble-Jet (trademark) system, those using the basic principle disclosed in, for example, U.S. Pat. Nos. 4,723,129 and 4,740,796 are preferred. This system may be applied to any of the so-called On-Demand type and continuous type. In particular, the aqueous ink according to the present invention may be effectively applied to On-Demand type recording heads and ink jet recording apparatus. In the case of the On-Demand type, at least one driving signal, which corresponds to recording information and gives a rapid temperature rise exceeding nuclear boiling, is applied to an electrothermal converter arranged corresponding to a sheet or liquid path, in which an ink is retained, thereby causing the electrothermal converter to generate thermal energy to cause film boiling on the heat-acting surface of a recording head. As a result, a bubble can be formed in the ink in response to the driving signal in relation of one to one. The ink is ejected through an ejection opening by the growth-contraction of this bubble to form at least one droplet. When the driving signal is applied in the form of a pulse, the growth-contraction of the bubble is suitably conducted in a moment, so that the ejection of the ink excellent in responsiveness in particular can be achieved. It is therefore preferable to use such pulsed signals. As the pulsed driving signal, such signals as described in U.S. Pat. Nos. 4,463,359 and 4,345,262 are suitable. When the conditions described in U.S. Pat. No. 4,313,124 that discloses an invention relating to the rate of temperature rise on the heat-acting surface are adopted, far excellent recording can be conducted.

The aqueous ink according to the present invention is effectively applied to such combined constructions (linear liquid flow path or perpendicular liquid flow path) of ejection openings, a liquid path and electrothermal converters as disclosed in the above-described publications. Besides the above, the aqueous ink according to the present invention is also effectively applied to such a construction that a heat-acting portion is arranged in a curved region. The above construction disclosed in U.S. Pat. Nos. 4,558,333 and 4,459,600. In addition, the aqueous ink according to the present invention is also effectively applied to a recording head of the construction in which an ejection slit common to a plurality of electrothermal converters is used as an ejection part of the electrothermal converters (Japanese Patent Application Laid-Open No. 59-123670). Further, the aqueous ink according to the present invention is also effectively applied to a full-line type recording head having a length corresponding to the width of the greatest recording medium, on which the recording apparatus can conduct recording. Such a recording head may be of any of the construction in which the length is met by such a combination of plural recording heads as disclosed in the above-described publications and the construction of one recording head integrally formed. The aqueous ink according to the present invention can more effectively exhibit the above-described effect when the ink is applied to these constructions.

The applications of the aqueous ink according to the present invention are not limited to those described above, and the ink may also be effectively used in such ink jet recording apparatus as described below. Examples of recording heads used in such apparatus include a replaceable, chip type recording head, in which electrical connection to an apparatus body and feed of an ink from the apparatus body become feasible by being installed in the apparatus body, and a cartridge type recording head, in which an ink tank is provided integrally with a recording head. The ink jet recording apparatus, to which the aqueous ink according to the present invention is applied, are preferably so constructed that recovery means for a recording head and preliminary auxiliary means are added because the effect of the present invention can be more stably achieved. Examples of such means include capping means, cleaning means and pressurizing or sucking means for the recording head, preliminary heating means by electrothermal converters, other heating elements than these converters or combinations thereof, and preliminary ejection modes in which ejection separate from recording is conducted.

Figure 2:
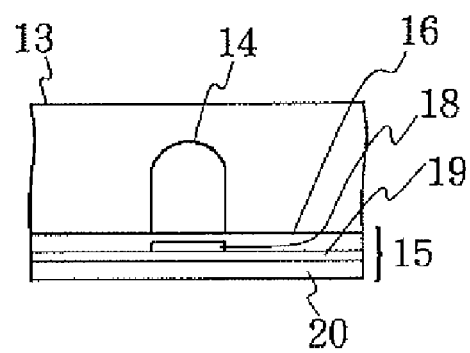
FIG. 2 is a transverse cross-sectional view of the recording head.

An exemplary ink jet recording apparatus will hereinafter be described. First of all, an exemplary construction of a recording head, which is a main component of the ink jet recording apparatus making good use of thermal energy is shown in FIG. 1 and FIG. 2. FIG. 1 is a cross-sectional view of a recording head 13 taken along an ink flow path, and FIG. 2 is a cross-sectional view taken along line 2-2 in FIG. 1. The recording head 13 is constructed by a member having an ink flow path (nozzle) 14 and a heating element substrate 15. The heating element substrate 15 is constructed by a protective layer 16, electrodes 17-1 and 17-2, a heating resistor layer 18, a heat accumulating layer 19 and a substrate 20.

When pulsed electric signals are applied to the electrodes 17-1 and 17-2 of the recording head 13, the heating element substrate 15 rapidly generates heat at the region shown by 'n' to generate bubbles in an ink 21, which is in contact with this region. A meniscus 23 of the ink is projected by the pressure of the bubbles, and the ink 21 is ejected from an ejection orifice 22 of the nozzle 14 toward a recording medium 25 in the form of ink droplets 24.

Figure 3:
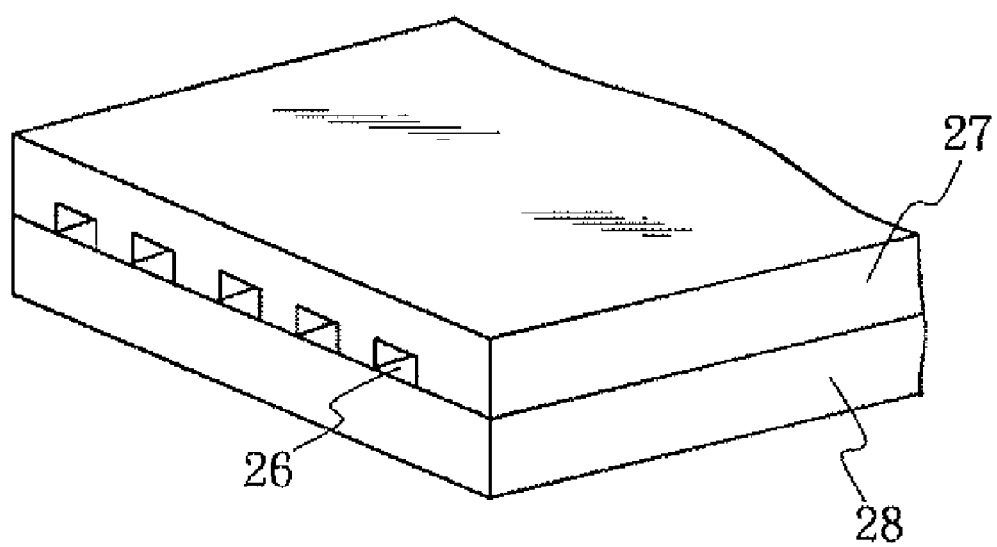
FIG. 3 is a perspective view of a multi-head including an array of a number of recording heads as illustrated in FIG. 1.

FIG. 3 illustrates an appearance of an exemplary multihead including an array of a number of heads as shown in FIG. 1. The multi-head is constructed by a glass plate 27 having a number of nozzles 26 and a heating head 28 similar to that described in FIG. 1.

Figure 4:
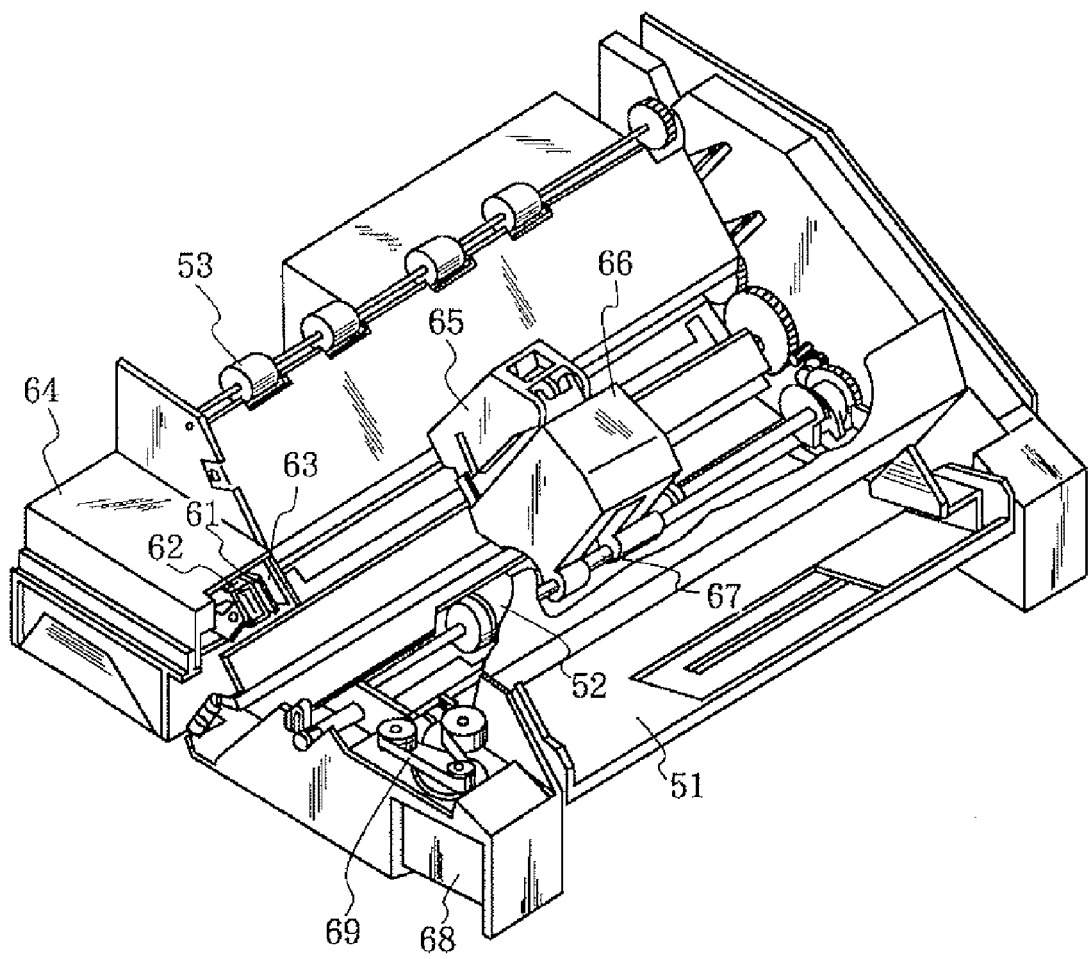
FIG. 4 is a perspective view illustrating an exemplary ink jet recording apparatus.

FIG. 4 is a perspective view illustrating an exemplary ink jet recording apparatus in which the recording head has been incorporated. One end of a blade 61 that is a wiping member is held by a blade-holding member to form a cantilever. The blade 61 is arranged at a position adjacent to a recording region, in which a recording head 65 operates, and is held in a form protruding into the course through which the recording head 65 is moved. A cap 62 for the face of ejection openings of the recording head 65 is provided at a home position adjacent to the blade 61, and is so constructed that the cap moves in a direction perpendicular to a direction in which the recording head 65 is moved, and comes into contact with the face of the ejection openings to cap the face. An ink absorbing member 63 is provided adjoiningly to the blade 61 and, similar to the blade 61, held in a form protruding into the course through which the recording head 65 is moved. An ejection-recovery portion 64 is constructed by the blade 61, cap 62 and ink absorbing member 63. Water and/or dust are removed from the face of the ink-ejecting openings by the blade 61 and ink absorbing member 63.

The recording head 65 has an ejection-energy-generating means and serves to eject the ink on a recording medium set in an opposing relation to the ejection opening face provided with the ejection openings to conduct recording. The recording head 65 is mounted on a carriage 66 so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

A feeding part 51, from which the recording medium is inserted, and feed rollers 52 driven by a motor (not illustrated) are provided. With such a construction, the recording medium is fed to the position opposite to the ejection opening face of the recording head 65, and discharged from a discharge section provided with discharge rollers 53 with the progress of recording. The cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection opening face of the recording head 65 is wiped.

When the cap 62 comes into contact with the ejection opening face of the recording head 65 to cap the face, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection opening face of the recording head 65 is also wiped at the time of this movement. The movement of the recording head 65 to its home position is made not only when the recording is completed or the recording head 65 is recovered for ejection, but also when the recording head 65 is moved between recording regions for the purpose of recording, during which the recording head is moved to the home position adjacent to each recording region at given intervals, where the ejection opening face is wiped in accordance with this movement.

Figure 5:
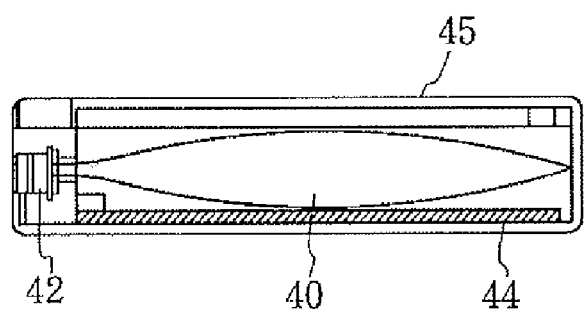
FIG. 5 is a longitudinal cross-sectional view illustrating an ink cartridge.

FIG. 5 illustrates an exemplary ink cartridge in which an ink to be fed to a recording head through an ink feeding member, for example, a tube has been stored. Here, an ink storage portion 40 as exemplified by a bag for the ink, in which the ink to be fed has been stored, is illustrated. One end thereof is provided with a stopper 42 made of rubber. A needle (not illustrated) may be inserted into this stopper 42 so that the ink in the bag 40 for the ink can be fed to the recording head. A waste ink is received in an ink absorbing member 44.

Figure 6:
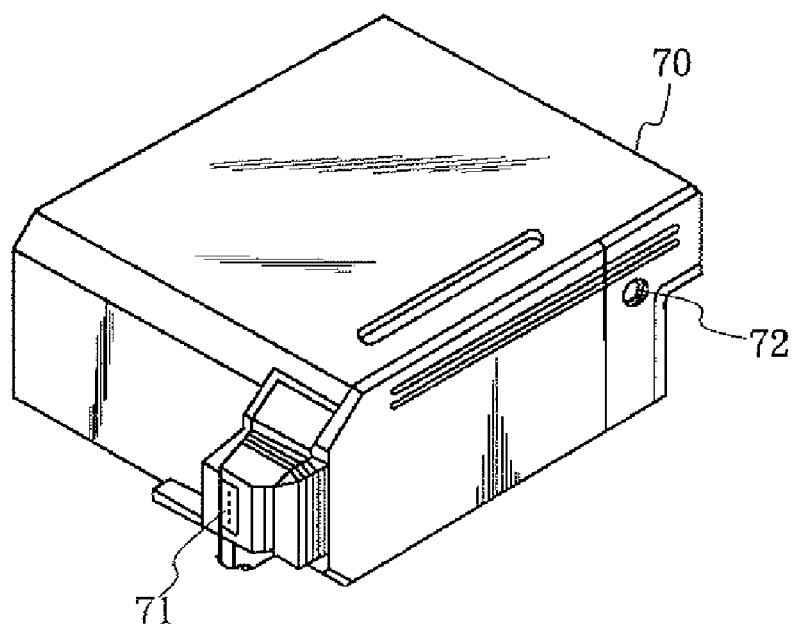
FIG. 6 is a perspective view illustrating an exemplary recording unit.

The ink jet recording apparatus is not limited to the apparatus in which the recording head and the ink cartridge are separately provided as described above. Therefore, an apparatus, in which the recording head and the ink cartridge are integrally formed as shown in FIG. 6, may also be suitably used. FIG. 6 illustrates a recording unit 70 in which an ink storage portion storing an ink, for example, an ink absorbing member, is housed. The ink in the ink absorbing member is ejected in the form of ink droplets through a recording head portion 71 having a plurality of ejection openings. The ink storage portion may also be constructed by a bag for the ink, in the interior of which a spring is provided, without using the ink absorbing member. An air passage 72 is provided for communicating the interior of the cartridge with the atmosphere. This recording unit 70 is used in place of the recording head 65 shown in FIG. 4, and is detachably installed on the carriage 66.

Figure 7:
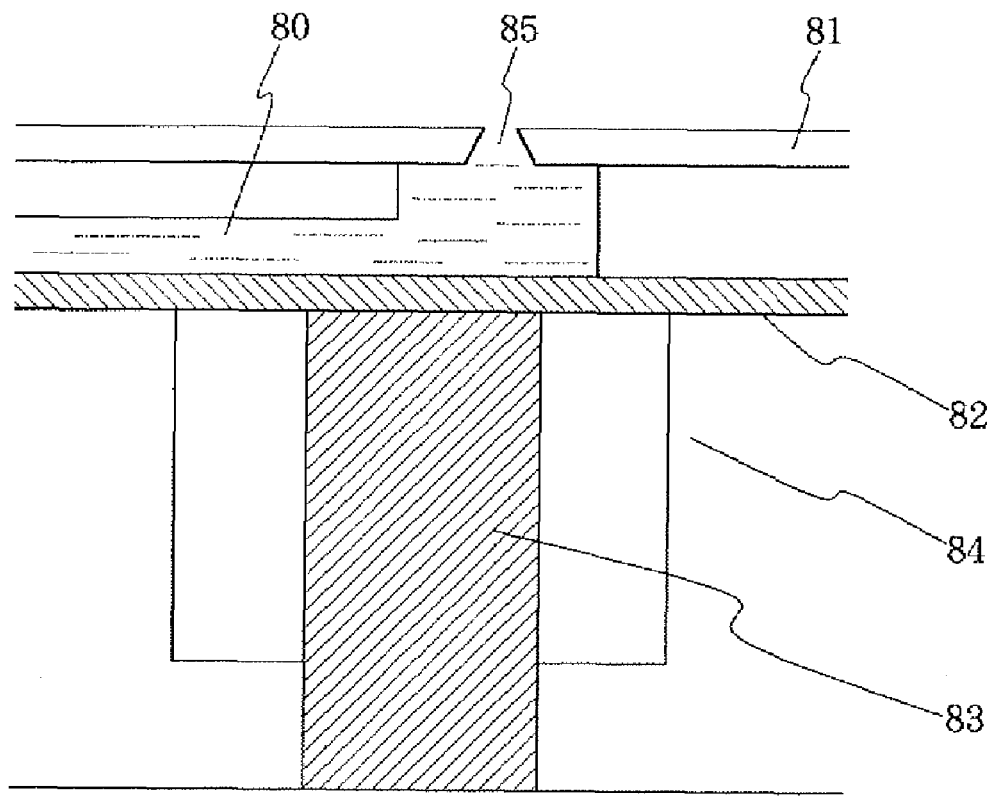
FIG. 7 typically illustrates the construction of an exemplary recording head.

An ink jet recording apparatus making good use of mechanical energy will hereinafter be described. The ink jet recording apparatus has a recording head that is equipped with a nozzle-forming substrate having a plurality of nozzles, pressure-generating devices formed by a piezoelectric material and an electric conductive material, and an ink filled around the pressure-generating devices and serves to eject ink droplets from ejection openings by displacing the pressure-generating devices by application of a voltage. FIG. 7 typically illustrates an example of the construction of the recording head. The recording head is constructed by an ink flow path 80 linked to an ink chamber, an orifice plate 81, a vibration plate 82 for applying a pressure to an ink, a piezoelectric element 83 bonded to the vibration plate 82 and displaced by an electric signal, and a substrate 84 for supporting and fixing the orifice plate 81 and vibration plate 82 thereon. An ink is ejected as ink droplets having a desired volume through the orifice plate 81 from the ink flow path 80 communicating with an ink chamber (not illustrated). At this time, the ink is ejected by the action of the piezoelectric element 83 bonded to the vibration plate 82 and displaced by an electric signal. The vibration plate 82 bonded to the piezoelectric element 83 is deformed by strain stress generated by applying a pulsed voltage to the piezoelectric element 83, thereby pressurizing the ink in the ink flow path 80 to eject ink droplets from the ejection opening 85 of the orifice plate 81. Such a recording head can be incorporated for use into an ink jet recording apparatus similar to that illustrated in FIG. 2.

EXAMPLES

The present invention will hereinafter be described specifically by the following Examples and Comparative Examples. However, the present invention is not limited by these examples unless going beyond the gist of the present invention. Incidentally, all designations of "part" or "parts" and "%" as will be used in the following examples mean part or parts by mass and mass % unless expressly noted.

[Preparation of Pigment Dispersions]

Pigment Dispersions 1 to 14 were prepared according to the following process. Incidentally, carbon black used is Black Pearls 880 (trade name, product of CABOT) having a specific surface area of 220 m$^2$/g and a DBP oil absorption of 105 mL/100 g.

(Preparation of Pigment Dispersion 1)

To a solution with 5 g of concentrated hydrochloric acid dissolved in 10 g of water, was added 1.6 g of p-aminobenzoic acid in a state cooled to 5° C. A container, in which this solution was contained, was then placed in an ice bath, and the solution was stirred, whereby the solution always remained in a state kept to 10° C. or lower, to which a solution with 1.8 g of sodium nitrite dissolved in 20 g of water of 5° C. was added. After this solution was stirred for additional 15 minutes, 10 g of carbon black was added with stirring. Thereafter, the resultant mixture was stirred for additional 30 minutes. After the resultant slurry was filtered through filter paper (trade name: Standard Filter Paper No. 2; product of Advantec), the resultant particles were fully washed with water and dried in an oven controlled to 105° C., thereby preparing self-dispersion type carbon black 1.

Water was further added to the self-dispersion type carbon black 1 obtained above to disperse the carbon black so as to give a pigment concentration of 15 mass %, thereby preparing a dispersion. The resultant dispersion was centrifuged under conditions of 5,000 rpm and 10 minutes using a high-speed refrigerated centrifuges CR21G (manufactured by Hitachi Koki) to separate an aggregated component. The remainder was filtered under pressure through a filter (diameter: 47 mm, FR70 Filter, product of Fuji Photo Film) having a pore size of 0.7 μm to obtain Pigment Dispersion 1. Pigment Dispersion 1 in a condition where the self-dispersion type carbon black 1 (pigment 1), onto the surfaces of particles of which —C$_6$H$_4$—COONa group had been introduced, was dispersed in water was obtained according to the above-described process. The pigment concentration of the resultant Pigment Dispersion 1 was 15 mass %.

(Preparation of Pigment Dispersions 2 to 6)

Pigment Dispersions 2 to 6 were prepared in the same manner as in the preparation of Pigment Dispersion 1 except that amounts of concentrated hydrochloric acid, p-aminobenzoic acid and sodium nitrite used, and the kind of the filter used in the purification were changed as shown in the following Table 1. The pigment concentrations in the resultant Pigment Dispersions 2 to 6 were all 15 mass %. Incidentally, the data as to Pigment Dispersion 1 are also shown collectively in Table 1.

TABLE 1

Materials used in preparation of Pigment Dispersions 1 to 6 and purification conditions

| No. of Pigment Dispersion | Concentrated hydrochloric acid [g] | p-Aminobenzoic acid [g] | Sodium nitrite [g] | Filter |
|---|---|---|---|---|
| 1 | 5 | 1.6 | 1.8 | FR70 |
| 2 | 10 | 3.2 | 3.6 | FR70 |
| 3 | 12 | 3.6 | 4.0 | FR70 |
| 4 | 2.5 | 0.6 | 0.6 | HDC II 2.5 μm |
| 5 | 2.5 | 0.8 | 0.9 | HDC II 2.5 μm |
| 6 | 2.5 | 0.8 | 0.6 | HDC II 2.5 μm |

(Preparation of Pigment Dispersion 7)

A styrene-acrylic acid copolymer [copolymerization ratio: styrene/acrylic acid=70/30 (mass ratio), weight average molecular weight (Mw): 10,000] that is a dispersant was first provided according to a method known per se in the art. The styrene-acrylic acid copolymer, water and potassium hydroxide equivalent to the acid value of the copolymer were mixed, the resultant mixture was stirred at 80° C. to prepare a 20 mass % aqueous solution of the styrene-acrylic acid copolymer. Then, 15 parts of carbon black, 30 parts (6 parts in terms of solid content) of the 20 mass % aqueous solution of the styrene-acrylic acid copolymer and 55 parts of water were mixed to conduct a dispersing treatment in the following manner. The dispersing treatment was conducted under conditions of a bead filling rate of 85%, a bead diameter of 0.1 mm, a number of revolutions of 2,500 rpm and a dispersion time of 2 hours using a bead mill (trade name: Minicer, volume: 0.6 L, manufactured by Ashizawa Finetech). The dispersion obtained above was further centrifuged under conditions of 5,000 rpm and 30 minutes using a high-speed refrigerated centrifuges CR21G (manufactured by Hitachi Koki) to separate an aggregated component. The remainder was filtered under pressure through a filter (diameter: 47 mm, FR70 Filter, product of Fuji Photo Film) having a pore size of 0.7 μm to obtain Pigment Dispersion 7. Pigment Dispersion 7 in a condition where the resin-dispersion type carbon black 7 (pigment 7) was dispersed in water was obtained according to the above-described process. The pigment concentration in the resultant Pigment Dispersion 7 was 15 mass %. In Table 1, the kinds of the filters are as follows. FR70 (pore size: 0.7 μm, diameter: 47 mm, trade name: FR70 Filter, product of Fuji Photo Film); and HDC II 2.5 μm (pore size: 2.5 μm, diameter: 47 mm, trade name: HDC II 2.5 μm, product of PALL).

(Preparation of Pigment Dispersions 8 to 14)

Pigment Dispersions 8 to 14 were prepared in the same manner as in the preparation of Pigment Dispersion 7 except that the kind of the filter used in the purification was changed as shown in the following Table 2. The pigment concentrations in the resultant Pigment Dispersions 8 to 14 were all 15 mass %. Incidentally, the data as to Pigment Dispersion 7 are also shown collectively in Table 2. In Table 2, the kinds of the filters are as follows. FR70 (pore size: 0.7 μm, diameter: 47 mm, trade name: FR70 Filter, product of Fuji Photo Film); and HDC II 1.2 μm (pore size: 1.2 μm, diameter: 47 mm, trade name: HDC II 1.2 μm, product of PALL).

TABLE 2

Dispersing conditions and purification conditions used in preparation of Pigment Dispersions 7 to 14

| No. of pigment dispersion | Copolymerization ratio of styrene/acrylic acid [mass ratio] | Weight average molecular weight [Mw] | Acid value [mg KOH/g] | Packing rate [%] | Bead diameter [mm] | Number of revolutions [rpm] | Dispersion time [hour] | Filter |
|---|---|---|---|---|---|---|---|---|
| 7 | 75/25 | 10,000 | 190 | 85 | 0.1 | 2,500 | 2 | FR70 |
| 8 | 70/30 | 8,000 | 225 | 85 | 0.1 | 2,500 | 4 | FR70 |
| 9 | 80/20 | 10,000 | 155 | 85 | 0.1 | 3,000 | 1.5 | HDC II 1.2 μm |
| 10 | 75/25 | 10,000 | 192 | 85 | 0.1 | 2,500 | 2 | HDC II 1.2 μm |
| 11 | 75/25 | 8,000 | 189 | 80 | 0.1 | 2,500 | 2.5 | HDC II 1.2 μm |
| 12 | 80/20 | 12,000 | 153 | 80 | 0.1 | 2,500 | 3 | HDC II 1.2 μm |
| 13 | 75/25 | 12,000 | 190 | 80 | 0.1 | 3,000 | 1 | FR70 |
| 14 | 75/25 | 9,000 | 187 | 85 | 0.1 | 2,200 | 2 | HDC II 1.2 μm |

[Determination of Water-Soluble Organic Solvent which does not Substantially Solvate Carbon Black]

With respect to each of the water-soluble organic solvents used in the preparation of inks, whether the organic solvent is a water-soluble organic solvent which does not substantially solvate carbon black or not was determined by the following procedure. Ten grams of each of the pigment dispersions obtained above was put in a petri dish having an inner diameter of 5 cm and dried for one day in an oven controlled to a temperature of 60° C. to evaporate water. Thereafter, the resultant dried product was ground by an agate mortar to obtain a ground product of carbon black. After 0.5 g of the ground product of carbon black was weighed out in a beaker, 10 g of a water-soluble organic solvent, which was an object of determination, was added into the beaker, and the resultant liquid mixture was stirred for one hour by a stirrer, the stirred liquid mixture was left at rest for one hour. With respect to this liquid mixture, whether solid-liquid phase separation occurred or not was visually determined. At this time, a water-soluble organic solvent undergoing the solid-liquid phase separation and a water-soluble organic solvent undergoing no solid-liquid phase separation were determined to be a water-soluble organic solvent that does not substantially solvate carbon black and a water-soluble organic solvent that solvates carbon black, respectively. In such a manner, water-soluble organic solvents that do not substantially solvate carbon black in each of the pigment dispersions were determined. The results are shown in the following Table 3. In Table 3, a water-soluble organic solvent that does not substantially solvate carbon black and a water-soluble organic solvent that solvates carbon black are indicated by 'o' and 'x', respectively.

TABLE 3

Determination results of a water-soluble organic solvent that does not substantially solvate carbon black

| | No. of pigment dispersion | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Glycerol | x | x | x | x | x | x | x | x | x | x | x | x | x | x |
| Polyethylene glycol (*1) | o | o | o | o | o | o | o | o | o | o | o | o | o | o |
| Trimethylolpropane | x | x | x | x | x | x | x | x | x | x | x | x | x | x |
| Diethylene glycol | x | x | x | x | x | x | x | x | x | x | x | x | x | x |

(*1) Weight average molecular weight: 600

[Preparation of Inks]

The pigment dispersions obtained above and the following components were used to prepare 18 inks. In the preparation of the inks, their corresponding components shown in the following Tables 4 and 5 were mixed and stirred for one hour, and the resultant respective mixtures were filtered under pressure through their corresponding filters shown in the bottom lines of the following Tables 4 and 5, thereby obtaining Inks 1 to 18.

TABLE 4

Composition of inks

| | No. of ink | | | | | | | |
|---|---|---|---|---|---|---|---|---|
| | 1 | 2 | 3 | 4 | 5 | 6 | 7 | 8 |
| Pigment Dispersion 1 | 26.7 | | 26.7 | 26.7 | | | | |
| Pigment Dispersion 2 | | 26.7 | | | | | | |
| Pigment Dispersion 3 | | | | | 26.7 | | | |
| Pigment Dispersion 4 | | | | | | 26.7 | | |
| Pigment Dispersion 5 | | | | | | | 26.7 | |
| Pigment Dispersion 6 | | | | | | | | 26.7 |
| Glycerol | 5.0 | 5.0 | 5.0 | 8.0 | 5.0 | 5.0 | 5.0 | 5.0 |
| Polyethylene glycol (*1) | 5.0 | 5.0 | 8.0 | 1.0 | 5.0 | 5.0 | 5.0 | 5.0 |
| Trimethylolpropane | 3.0 | 3.0 | 1.5 | 4.0 | 3.0 | 3.0 | 3.0 | 3.0 |
| Diethylene glycol | 3.0 | 3.0 | 1.5 | 3.0 | 3.0 | 3.0 | 3.0 | 3.0 |
| Acetylenol EH (*2) | 0.25 | 0.25 | 0.25 | 0.25 | 0.25 | 0.25 | 0.25 | 0.25 |
| Ion-exchanged water | 57.05 | 57.05 | 57.05 | 57.05 | 57.05 | 57.05 | 57.05 | 57.05 |
| Filter (*3) | a | b | a | a | a | c | c | c |

(*1) Weight average molecular weight: 600
(*2) Acetylene glycol ethylene oxide adduct (surfactant; product of Kawaken Fine Chemicals)
(*3) The following filters a to c
a: Diameter: 47 mm, pore size: 0.7 μm (product name: FR70, product of Fuji Photo Film)
b: Diameter: 47 mm, pore size: 1.2 μm (product name: SD1200, product of PALL)
c: Diameter: 47 mm, pore size: 2.5 μm (product name: HDCII2.5 μm, product of PALL)

TABLE 5

Composition of inks

| | No. of ink | | | | | | | | | |
|---|---|---|---|---|---|---|---|---|---|---|
| | 9 | 10 | 11 | 12 | 13 | 14 | 15 | 16 | 17 | 18 |
| Pigment Dispersion 7 | 26.7 | 26.7 | 26.7 | | | | | | | |
| Pigment Dispersion 8 | | | | 26.7 | | | | | | |
| Pigment Dispersion 9 | | | | | 26.7 | | | | | |
| Pigment Dispersion 10 | | | | | | 26.7 | | | | |
| Pigment Dispersion 11 | | | | | | | 26.7 | | | |
| Pigment Dispersion 12 | | | | | | | | 26.7 | | |
| Pigment Dispersion 13 | | | | | | | | | 26.7 | |
| Pigment Dispersion 14 | | | | | | | | | | 26.7 |
| Glycerol | 5.0 | 5.0 | 8.0 | 5.0 | 5.0 | 5.0 | 5.0 | 5.0 | 5.0 | 5.0 |
| Polyethylene glycol (*1) | 5.0 | 8.0 | 1.0 | 5.0 | 5.0 | 5.0 | 5.0 | 5.0 | 5.0 | 5.0 |
| Trimethylolpropane | 3.0 | 1.5 | 4.0 | 3.0 | 3.0 | 3.0 | 3.0 | 3.0 | 3.0 | 3.0 |
| Diethylene glycol | 3.0 | 1.5 | 3.0 | 3.0 | 3.0 | 3.0 | 3.0 | 3.0 | 3.0 | 3.0 |
| Acetylenol EH (*2) | 0.25 | 0.25 | 0.25 | 0.25 | 0.25 | 0.25 | 0.25 | 0.25 | 0.25 | 0.25 |
| Ion-exchanged water | 57.05 | 57.05 | 57.05 | 57.05 | 57.05 | 57.05 | 57.05 | 57.05 | 57.05 | 57.05 |
| Filter (*3) | a | c | a | a | b | b | b | c | c | d |

(*1) Weight average molecular weight: 600
(*2) Acetylene glycol ethylene oxide adduct (surfactant; product of Kawaken Fine Chemicals)
(*3) The following filters a to d
a: Diameter: 47 mm, pore size: 0.7 μm (product name: FR70, product of Fuji Photo Film)
b: Diameter: 47 mm, pore size: 1.2 μm (product name: SD1200, product of PALL)
c: Diameter: 47 mm, pore size: 2.5 μm (product name: HDCII2.5 μm, product of PALL)
d: Diameter: 47 mm, pore size: 3.0 μm (product name: FM300, product of Fuji Photo Film)

[Properties of Inks]

With respect to the Inks 1 to 18 obtained above, their physical properties were determined according to the following respective methods. The resultant results are shown in the following Tables 6 and 7.

(Proportion Made Up by the Volume of Particles Having a Particle Size of 0.2 μm or More and Less than 0.5 μm, and Average Particle Size Value)

With respect to a liquid obtained by diluting each ink by 500 times (by mass) with pure water, the proportion made up by the volume of particles having a particle size of 0.2 μm or more and less than 0.5 μm, and an average particle size value (volume average particle diameter $d_{50}$) were determined. A particle size distribution meter (UPA150EX; manufactured by NIKKISO) was used in the determination. The determination conditions are as follows.

[Determination Conditions]
Setzero: 30 s
Measurement time: 120 s
Number of measurements: 3 times
Refractive index of particles: 1.8
Solvent: Water
Filter: Standard
Sensitivity: Standard.

(Number of Particles Having a Particle Size of 0.5 μm or More and Less than 5.0 μm)

With respect to a liquid obtained by diluting each ink by 40 times (by mass) with pure water, the number of particles having a particle size of 0.5 μm or more and less than 5.0 μm was counted. The number of the particles having a particle size of 0.5 μm or more and less than 5.0 μm per mL of the ink was determined from the resultant value. A particle size distribution meter (Accusizer 780APS; manufactured by Particle Sizing System) was used in the determination. The determination conditions are as follows.

[Determination Conditions]
Measurement time: 60 s
Number of Channels: 128
Flow rate: 60 mL/min
Sample LOOP volume: 1 mL
First stage dilution factor: 30 times
Second stage dilution factor: 40 times.

TABLE 6

Properties of inks according to Examples

| | Example | | | | | | | | | |
|---|---|---|---|---|---|---|---|---|---|---|
| | 1 | 2 | 3 | 4 | 5 | 6 | 7 | 8 | 9 | 10 |
| No. of ink | 1 | 2 | 3 | 4 | 9 | 10 | 11 | 12 | 13 | 14 |
| No. of pigment dispersion | 1 | 2 | 1 | 1 | 7 | 7 | 7 | 8 | 9 | 10 |
| Containing particles having a particle size of 0.5 μm or more | ○ | ○ | ○ | ○ | ○ | ○ | ○ | ○ | ○ | ○ |
| Proportion made up by the volume of particles having a particle size of 0.2 μm or more and less than 0.5 μm [%] (*1) | 0.20 | 0.29 | 0.20 | 0.20 | 0.23 | 0.23 | 0.21 | 0.15 | 0.25 | 0.30 |
| Number of particles having a particle size of 0.5 μm or more and less than 5.0 μm [particles/mL of ink] (*2) | $7.5 \times 10^6$ | $9.5 \times 10^6$ | $7.6 \times 10^6$ | $7.2 \times 10^6$ | $6.9 \times 10^6$ | $7.0 \times 10^6$ | $7.5 \times 10^6$ | $4.6 \times 10^6$ | $9.1 \times 10^6$ | $9.5 \times 10^6$ |
| Average particle size value of carbon black particles [μm] | 0.094 | 0.125 | 0.096 | 0.094 | 0.095 | 0.095 | 0.102 | 0.060 | 0.130 | 0.122 |

(*1) Proportion [%] made up by the volume of carbon black particles having a particle size of 0.2 μm or more and less than 0.5 μm based on the total volume of all the carbon black particles in the ink.
(*2) Number [particles/mL of ink] of carbon black particles having a particle size of 0.5 μm or more and less than 5.0 μm.

TABLE 7

Properties of inks according to Comparative Examples

| | Comparative Example | | | | | | | |
|---|---|---|---|---|---|---|---|---|
| | 1 | 2 | 3 | 4 | 5 | 6 | 7 | 8 |
| No. of ink | 5 | 6 | 7 | 8 | 15 | 16 | 17 | 18 |
| No. of pigment dispersion | 3 | 4 | 5 | 6 | 11 | 12 | 13 | 14 |
| Containing particles having a particle size of 0.5 μm or more | ○ | ○ | ○ | ○ | ○ | ○ | ○ | ○ |
| Proportion made up by the volume of particles having a particle size of 0.2 μm or more and less than 0.5 μm [%] (*1) | 0.24 | 0.28 | 0.30 | 0.31 | 0.20 | 0.29 | 0.30 | 0.31 |
| Number of particles having a particle size of 0.5 μm or more and less than 5.0 μm [particles/mL of ink] (*2) | $5.0 \times 10^6$ | $9.5 \times 10^6$ | $1.1 \times 10^7$ | $9.8 \times 10^6$ | $6.8 \times 10^6$ | $9.5 \times 10^6$ | $1.1 \times 10^7$ | $9.7 \times 10^6$ |
| Average particle size value of carbon black particles [μm] | 0.059 | 0.131 | 0.130 | 0.129 | 0.059 | 0.131 | 0.129 | 0.128 |

(*1) Proportion [%] made up by the volume of carbon black particles having a particle size of 0.2 μm or more and less than 0.5 μm based on the total volume of all the carbon black particles in the ink.
(*2) Number [particles/mL of ink] of carbon black particles having a particle size of 0.5 μm or more and less than 5.0 μm.

(Rate of Change in Proportion Made Up by the Volume of Particles Having a Particle Size of 0.2 μm or More and Less than 0.5 μm Due to Preservation)

The proportion [%] made up by the volume of particles having a particle size of 0.2 μm or more and less than 0.5 μm was determined before and after preservation at a temperature of 60° C. for one month according to the following method, and the rate of change between before and after the preservation was calculated out, thereby comparing performance of the inks. The resultant results are shown in the following Tables 8 and 9.

First of all, the proportion made up by the volume of particles having a particle size of 0.2 μm or more and less than 0.5 μm in each ink was determined. This proportion was regarded as the proportion (A) made up by the volume of particles having a particle size of 0.2 μm or more and less than 0.5 μm before the preservation. Then, 100 g of each ink was placed in a container made of Teflon (trademark), and the container was preserved in a closed state for one month in an oven controlled to 60° C. Thereafter, the container was taken out of the oven, and the ink was cooled back to ordinary temperature and uniformly stirred in the container. With respect to the ink after the preservation, the proportion made up by the volume of particles having a particle size of 0.2 μm or more and less than 0.5 μm was determined. This proportion was regarded as the proportion (B) made up by the volume of particles having a particle size of 0.2 μm or more and less than 0.5 μm after the preservation. Incidentally, the determination apparatus and determination conditions were the same as in the determination of the proportion of the volume of particles having a particle size of 0.2 μm or more and less than 0.5 μm as described above. The rate of change ((B)/(A) value) between before and after the preservation was determined by comparing the proportion (A) before the preservation with the proportion (B) after the preservation. A higher rate of change ((B)/(A) value) indicates that such an ink is not preserved in a stable state with time, i.e., the ejection stability thereof is easier to be lowered.

TABLE 8

Evaluation results of change caused by preservation on inks of Examples

| | Example | | | | | | | | | |
|---|---|---|---|---|---|---|---|---|---|---|
| | 1 | 2 | 3 | 4 | 5 | 6 | 7 | 8 | 9 | 10 |
| No. of ink | 1 | 2 | 3 | 4 | 9 | 10 | 11 | 12 | 13 | 14 |
| Proportion (A) made up by the volume of particles having a particle size of 0.2 μm or more and less than 0.5 μm before preservation [%] (*1) | 0.20 | 0.29 | 0.20 | 0.20 | 0.23 | 0.23 | 0.21 | 0.15 | 0.25 | 0.30 |
| Proportion (B) made up by the volume of particles having a particle size of 0.2 μm or more and less than 0.5 μm after preservation [%] (*2) | 0.23 | 0.30 | 0.24 | 0.21 | 0.23 | 0.25 | 0.23 | 0.26 | 0.29 | 0.30 |
| (B)/(A) value | 1.15 | 1.03 | 1.20 | 1.05 | 1.00 | 1.09 | 1.10 | 1.73 | 1.16 | 1.00 |

(*1) Proportion (A) [%] made up by the volume of carbon black particles having a particle size of 0.2 μm or more and less than 0.5 μm based on the total volume of all the carbon black particles in the ink before the preservation.
(*2) Proportion (B) [%] made up by the volume of carbon black particles having a particle size of 0.2 μm or more and less than 0.5 μm based on the total volume of all the carbon black particles in the ink after the preservation.

TABLE 9

Evaluation results of change caused by preservation on inks of Comparative Examples

| | Comparative Example | | | | | | | |
|---|---|---|---|---|---|---|---|---|
| | 1 | 2 | 3 | 4 | 5 | 6 | 7 | 8 |
| No. of ink | 5 | 6 | 7 | 8 | 15 | 16 | 17 | 18 |
| Proportion (A) made up by the volume of particles having a particle size of 0.2 μm or more and less than 0.5 μm before preservation [%] (*1) | 0.24 | 0.28 | 0.30 | 0.31 | 0.20 | 0.29 | 0.30 | 0.31 |
| Proportion (B) made up by the volume of particles having a particle size of 0.2 μm or | 0.41 | 0.33 | 0.33 | 0.34 | 0.39 | 0.32 | 0.32 | 0.37 |

TABLE 9-continued

Evaluation results of change caused by preservation on inks of Comparative Examples

| | Comparative Example | | | | | | | |
|---|---|---|---|---|---|---|---|---|
| | 1 | 2 | 3 | 4 | 5 | 6 | 7 | 8 |
| more and less than 0.5 μm after preservation [%] (*2) | | | | | | | | |
| (B)/(A) value | 1.71 | 1.18 | 1.10 | 1.10 | 1.95 | 1.10 | 1.07 | 1.19 |

(*1) Proportion (A) [%] made up by the volume of carbon black particles having a particle size of 0.2 μm or more and less than 0.5 μm based on the total volume of all the carbon black particles in the ink before the preservation.
(*2) Proportion (B) [%] made up by the volume of carbon black particles having a particle size of 0.2 μm or more and less than 0.5 μm based on the total volume of all the carbon black particles in the ink after the preservation.

[Evaluation of Ejection Stability]

With respect to each of the inks, ejection stability before and after preservation at a temperature of 60° C. for one month was evaluated according to the following method. In the evaluation of the ejection stability, each of the inks obtained above (referred to as "ink before preservation"), and the ink after preserved at a temperature of 60° C. for one month (referred to as "ink after preservation") were evaluated as to the ejection stability. Incidentally, the ink after preservation was prepared according to the same method as in the preparation of the ink used in the evaluation as to the rate of change in the proportion made up by the volume of particles having a particle size of 0.2 μm or more and less than 0.5 μm by the preservation. The inks before and after preservation were respectively charged into in an ink jet recording apparatus PIXUS 850i" (manufactured by Canon Inc.) to continuously record characters on 1,000 A4-sized recording media (Office Planner; product of Canon Inc.). The resultant recorded matters were visually observed to evaluate the inks as to the ejection stability according to the following evaluation standard. The resultant results are shown in Table 10. As shown in Table 10, it was confirmed that when the inks according to Examples of the present invention were used, all the inks achieve excellent ejection stability compared with the cases where the inks of Comparative Examples were used.

[Evaluation Standard]

AAA: Recoding could be conducted on 1,000 sheets, and no difference was observed in the states of stripe, unevenness and dot misalignment when the first recorded matter and the 1,000-th recorded matter were compared;

AA: Recoding could be conducted on 1,000 sheets, and no difference was observed in the states of stripe, unevenness and dot misalignment when the first recorded matter and the 500-th recorded matter were compared, but some stripe, unevenness and dot misalignment occurred on the 1,000-th recorded matter;

A: Recoding could be conducted on 1,000 sheets, and some stripe, unevenness and dot misalignment occurred on the 500-th recorded matter, but no difference was observed in the states of stripe, unevenness and dot misalignment when the 500-th recorded matter and the 1,000-th recorded matter were compared;

B: Recoding could be conducted on 1,000 sheets, and considerable stripe, unevenness and dot misalignment occur on the 500-th recorded matter, and the states of stripe, unevenness and dot misalignment gradually became worse from the 500-th recorded matter to the 1,000-th recorded matter;

C: Recording could be conducted on one sheet, but the states of stripe, unevenness and dot misalignment were bad, and recoding could not be conducted on 500 sheets.

TABLE 10

Evaluation results of ejection stability

| | | Ejection stability | |
|---|---|---|---|
| | | Initial | After preservation |
| Example | 1 | AAA | AAA |
| | 2 | AAA | AAA |
| | 3 | AAA | AAA |
| | 4 | AA | AA |
| | 5 | A | A |
| | 6 | A | A |
| | 7 | AA | A |
| | 8 | A | A |
| | 9 | AA | A |
| | 10 | AA | AA |
| Comparative Example | 1 | B | C |
| | 2 | C | C |
| | 3 | C | C |
| | 4 | B | C |
| | 5 | B | C |
| | 6 | C | C |
| | 7 | C | C |
| | 8 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-082402, filed Mar. 24, 2006, which is hereby incorporated by reference herein in its entirety.

What is claimed is:

1. An aqueous ink comprising at least water, a water-soluble organic solvent and carbon black particles, the carbon black particles including carbon black particles having a particle size of 0.5 μm or more, wherein
a proportion made up by the volume of carbon black particles having a particle size of 0.2 μm or more and less than 0.5 μm is 0.3% or less based on the total volume of all the carbon black particles in the aqueous ink,
a number of carbon black particles having a particle size of 0.5 μm or more and less than 5.0 μm is $1.0 \times 10^7$ or less per mL of the aqueous ink, and an average particle size value of the carbon black particles is from 0.060 μm or more to 0.130 μm or less.

2. The aqueous ink according to claim 1, wherein a proportion (A) made up by the volume of carbon black particles having a particle size of 0.2 μm or more and less than 0.5 μm is 0.3% or less based on the total volume of all the carbon black particles in the aqueous ink, a proportion (B) made up by the volume of carbon black particles having a particle size of 0.2 μm or more and less than 0.5 μm in the ink after the aqueous ink is preserved at a temperature of 60° C. for one month is 0.3% or less based on the total volume of all the carbon black particles in the ink after the preservation, and the proportions (A) and (B) satisfy the relationship of (B)/(A)<1.7.

3. The aqueous ink according to claim 1, wherein the carbon black particles are self-dispersion type carbon black particles.

4. The aqueous ink according to claim 2, wherein the carbon black particles are self-dispersion type carbon black particles.

5. An ink jet recording method comprising ejecting an ink by an ink jet method, wherein the aqueous ink according to claim 1 is used as the ink.

6. An ink cartridge comprising an ink storage portion storing an ink, wherein the aqueous ink according to claim 1 is stored in the ink storage portion.

7. A recording unit comprising an ink storage portion storing an ink and a recording head for ejecting the ink, wherein the aqueous ink according to claim 1 is stored in the ink storage portion.

8. An ink jet recording apparatus comprising an ink storage portion storing an ink and a recording head for ejecting the ink, wherein the aqueous ink according to claim 1 is stored in the ink storage portion.

* * * * *